United States Patent
Conroy et al.

(10) Patent No.: US 9,727,505 B2
(45) Date of Patent: Aug. 8, 2017

(54) CLOCK CONTROL FOR DMA BUSSES

(71) Applicant: Apple Inc., Cupertino, CA (US)

(72) Inventors: David G. Conroy, El Granada, CA (US); Timothy J. Millet, Mountain View, CA (US); Joseph P. Bratt, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/709,336

(22) Filed: May 11, 2015

(65) Prior Publication Data

US 2015/0278134 A1    Oct. 1, 2015

Related U.S. Application Data

(63) Continuation of application No. 12/057,146, filed on Mar. 27, 2008, now Pat. No. 9,032,113.

(51) Int. Cl.

| | |
|---|---|
| *G06F 13/28* | (2006.01) |
| *G06F 13/34* | (2006.01) |
| *G06F 1/12* | (2006.01) |
| *G06F 1/32* | (2006.01) |
| *G06F 13/16* | (2006.01) |

(52) U.S. Cl.
CPC .............. *G06F 13/34* (2013.01); *G06F 1/12* (2013.01); *G06F 1/3203* (2013.01); *G06F 1/324* (2013.01); *G06F 1/3253* (2013.01); *G06F 1/3287* (2013.01); *G06F 13/1673* (2013.01); *G06F 13/28* (2013.01); *Y02B 60/1217* (2013.01); *Y02B 60/1235* (2013.01); *Y02B 60/1278* (2013.01); *Y02B 60/1282* (2013.01)

(58) Field of Classification Search
None
See application file for complete search history.

(56) References Cited

U.S. PATENT DOCUMENTS

| | | |
|---|---|---|
| 5,378,935 A | 1/1995 | Korhonen et al. |
| 5,559,942 A | 9/1996 | Gough et al. |
| 5,596,729 A | 1/1997 | Lester et al. |
| 5,884,100 A | 3/1999 | Normoyle et al. |

(Continued)

OTHER PUBLICATIONS

Harvey et al. "DMA Fundamentals on Various PC Platforms", Publisher: National Instruments Corp., Date: Apr. 1991, pp. 1-18.

*Primary Examiner* — Henry Tsai
*Assistant Examiner* — Christopher Bartels
(74) *Attorney, Agent, or Firm* — Gazdzinski & Associates, PC (57) ABSTRACT

A method and system is disclosed for accessing I/O and memory devices utilizing a DMA controller. Each device may be connected to the DMA controller through an individual channel. Clocking circuitry in the DMA may allow the DMA controller to send signals to each device at a prescribed frequency. Furthermore, the DMA controller is capable of activating and deactivating a channel clock, used in sending signals to the devices, based on the operational status of the individual devices. The DMA controller is also capable of tuning the channel clock dependant on the capabilities of any active devices. In this manner, the amount of bandwidth used during a DMA data transfer can be tailored to the specific requirements of the devices involved with the data transfer.

19 Claims, 8 Drawing Sheets

(56) References Cited

U.S. PATENT DOCUMENTS

| | | | |
|---|---|---|---|
| 5,948,080 A * | 9/1999 | Baker | G06F 9/4411 370/431 |
| 5,960,213 A | 9/1999 | Wilson | |
| 6,081,852 A | 6/2000 | Baker | |
| 6,081,877 A | 6/2000 | Taki | |
| 6,181,339 B1 | 1/2001 | DeCarmo et al. | |
| 6,396,316 B1 | 5/2002 | Cruz et al. | |
| 6,820,142 B2 | 11/2004 | Hofstee et al. | |
| 6,854,025 B2 | 2/2005 | Knight et al. | |
| 6,978,457 B1 | 12/2005 | Johl et al. | |
| 7,007,111 B2 | 2/2006 | Sihlbom et al. | |
| 7,062,587 B2 | 6/2006 | Zaidi et al. | |
| 7,117,277 B2 | 10/2006 | Mathewson et al. | |
| 7,133,228 B2 * | 11/2006 | Fung | G11B 20/00007 360/29 |
| 7,836,240 B2 | 11/2010 | Schoegler | |
| 2002/0026543 A1 * | 2/2002 | Tojima | G06F 13/30 710/22 |
| 2002/0062415 A1 | 5/2002 | Wang et al. | |
| 2002/0067744 A1 | 6/2002 | Fujii et al. | |
| 2002/0083221 A1 * | 6/2002 | Tsai | G06F 13/4221 710/1 |
| 2002/0146013 A1 * | 10/2002 | Karlsson | H04Q 11/0478 370/395.6 |
| 2002/0162043 A1 | 10/2002 | Messmer et al. | |
| 2002/0194401 A1 * | 12/2002 | Sakugawa | G06F 13/30 710/28 |
| 2003/0005231 A1 | 1/2003 | Ooi et al. | |
| 2003/0018837 A1 | 1/2003 | Hussain et al. | |
| 2003/0051192 A1 | 3/2003 | Pillay et al. | |
| 2003/0105799 A1 | 6/2003 | Khan et al. | |
| 2003/0163649 A1 | 8/2003 | Kapur et al. | |
| 2004/0264464 A1 * | 12/2004 | Wong | H04L 12/5601 370/390 |
| 2005/0180437 A1 * | 8/2005 | Twomey | H04L 12/42 370/401 |
| 2006/0031602 A1 | 2/2006 | Ellis et al. | |
| 2006/0047998 A1 | 3/2006 | Darcy | |
| 2006/0114906 A1 * | 6/2006 | Bowes | H04L 49/3072 370/392 |
| 2006/0129767 A1 | 6/2006 | Berenyi et al. | |
| 2006/0259796 A1 | 11/2006 | Fung | |
| 2007/0162651 A1 | 7/2007 | Gwilt et al. | |
| 2007/0174513 A1 | 7/2007 | Wrigley et al. | |
| 2008/0034310 A1 | 2/2008 | Kodosky et al. | |
| 2008/0040533 A1 | 2/2008 | Caulkins | |
| 2008/0162980 A1 | 7/2008 | Dahan et al. | |
| 2008/0209116 A1 | 8/2008 | Caulkins | |
| 2008/0228961 A1 | 9/2008 | Kim | |
| 2014/0032695 A1 * | 1/2014 | Michels | G06F 13/28 709/212 |

* cited by examiner

CLOCK CONTROL FOR DMA BUSSES

PRIORITY APPLICATIONS

This application is a continuation of and claims priority to co-owned, co-pending U.S. patent application Ser. No. 12/057,146 entitled "CLOCK CONTROL FOR DMA BUSSES", filed Mar. 27, 2008, which is incorporated by reference herein in its entirety.

BACKGROUND OF THE INVENTION

1. Field of the Invention

The present invention relates generally to controlling the clock signal distributed to a device by a Direct Memory Access controller along a bus.

2. Description of the Related Art

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Direct Memory Access ("DMA") controllers are widely used in modern electronic devices. The DMA controller may be used to transfer data in an electronic device without burdening the central processing unit ("CPU"). A CPU typically requires a list of commands, or instructions, to operate. These instructions are often grouped together as a program. Programs are typically stored in long term storage devices, such as a hard disk drive or non-volatile memory. Accessing these long term storage devices may require a certain amount of time, during which time the CPU must idly wait.

The use of a DMA controller can reduce the time a CPU must remain idle. Typically, the CPU hands off the fetching of the list of instructions that are grouped together as a program that will be needed in the immediate future to a DMA controller. The CPU may then be free to execute previously fetched instructions while the DMA fetches the program for the CPU. DMA controllers usually transfer data between a location in memory and an I/O device or between an I/O device and a location in memory. DMA controllers also may be used to transfer data between two locations in memory, or directly between I/O devices. The transfer of data by the DMA controller between some data source and to some data sink can be accomplished along a DMA channel.

A DMA channel is a path between the DMA controller and a device. The DMA channel typically passes data, command signals, and a clock signal to the device. However, transmitting a clock signal along an unused DMA channel can lead to unnecessary power consumption by the electronic device. Moreover, sending a clock signal along a DMA channel at a frequency higher than that required by the receiving device can also lead to unnecessary power consumption. This power consumption has become increasingly important as the demand for smaller portable electronic devices with long battery life and a wide range of functionality increases.

SUMMARY

Certain aspects of embodiments disclosed herein by way of example are summarized below. It should be understood that these aspects are presented merely to provide the reader with a brief summary of certain forms an invention disclosed and/or claimed herein might take and that these aspects are not intended to limit the scope of any invention disclosed and/or claimed herein. Indeed, any invention disclosed and/or claimed herein may encompass a variety of aspects that may not be set forth below.

In a first aspect of the present disclosure, a method for implementing a direct memory access (DMA) access is disclosed. In one embodiment, the method includes: receiving a data request from a requesting device at a scheduler; scheduling a DMA transfer within a scheduler queue, based at least in part on the data request; accessing a DMA channel interface corresponding to a target device; setting a clock speed for the requesting device and the target device; transmitting a DMA transfer command and a DMA channel clock to the requesting device and the target device; wherein the DMA transfer command is configured to initiate a data transfer; and when the scheduler queue is empty, disabling the DMA channel clock.

In one variant, the scheduling is performed according to a first-in-first-out (FIFO) scheme.

In another variant, the scheduling is performed according to a ranking scheme. In one such implementation, the ranking scheme includes assigning the requesting device a priority ranking, relative to one or more other requesting devices. In another implementation, the at least one priority ranking of the ranking scheme is configured to interrupt any other concurrent data transfer.

In a second aspect of the present disclosure, a direct memory access (DMA) controller configured to control one or more DMA accesses is disclosed. In one embodiment, the DMA controller includes: a scheduler configured to receive one or more data requests from one or more requesting devices; wherein the scheduler is further configured to schedule the received one or more data requests within a scheduler queue; a control circuitry configured to access one or more DMA channel interface and set a clock speed for each one of the one or more DMA channel interfaces; wherein the controller circuitry is further configured to transmit one or more DMA transfer commands and cause the transmission of one or more DMA channel clocks via the one or more DMA channel interfaces; wherein each one of the one or more DMA transfer commands are configured to initiate data transfers; and wherein the control circuitry is configured to disable the DMA channel clock when the scheduler queue is empty.

In one variant, the DMA controller includes a clock manager that includes a clock generation mechanism configured to create the one or more DMA channel clocks. In one such implementation, the clock generation mechanism includes one or more of: a programmable clock circuitry, a clock or frequency division circuitry, and a phase locked loop circuitry. In another implementation, the control circuitry is configured to enable and disable the clock manager. In still another implementation, the clock manager is directly coupled to the one or more DMA channel interfaces.

In another variant, the one or more DMA channel interfaces includes at least a first portion of independent DMA channel lines, and a second portion of shared DMA channel lines.

In a third aspect of the present disclosure, a method for controlling a direct memory access (DMA) channel during a DMA transfer is disclosed. In one embodiment, the method includes: receiving a DMA transfer command and a DMA channel clock; transmitting the DMA transfer command and the DMA channel clock to a target device; receiving one or more data transfers from the target device and buffering at least a first portion of the one or more data transfers within a ring buffer; and when the ring buffer is full or the target device has completed the one or more data transfers, transmitting the at least the first portion of the one or more data transfers.

In one variant, the method includes appropriately sizing the one or more data transfers for a requesting device.

In another variant, the transmitting the DMA transfer command and the DMA channel clock to the target device is performed via an individual DMA channel.

In another variant, the transmitting the DMA transfer command and the DMA channel clock to the target device is performed via a shared DMA channel.

In another variant, the ring buffer is full when no other data may be buffered within the ring buffer. In one such implementation, the method further includes determining whether there is more data to be transmitted to the requesting device after the act of transmitting the at least the first portion of the one or more data transfers. In one such case, the method further includes buffering at least a second portion of the one or more data transfers within a ring buffer, and when the ring buffer is full or the target device has completed the one or more data transfers, transmitting the at least the second portion of the one or more data transfers.

In still another variant, the method further includes tuning the DMA channel clock based on one or more parameters associated with a requesting device.

BRIEF DESCRIPTION OF THE DRAWINGS

These and ether features, aspects, and advantages of the present invention will become better understood when the following detailed description of certain exemplary embodiments is read with reference to the accompanying drawings in which like characters represent like parts throughout the drawings, wherein:

FIG. 3 is a flowchart depicting the operation of a channel control logic during a DMA transfer.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification, it should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
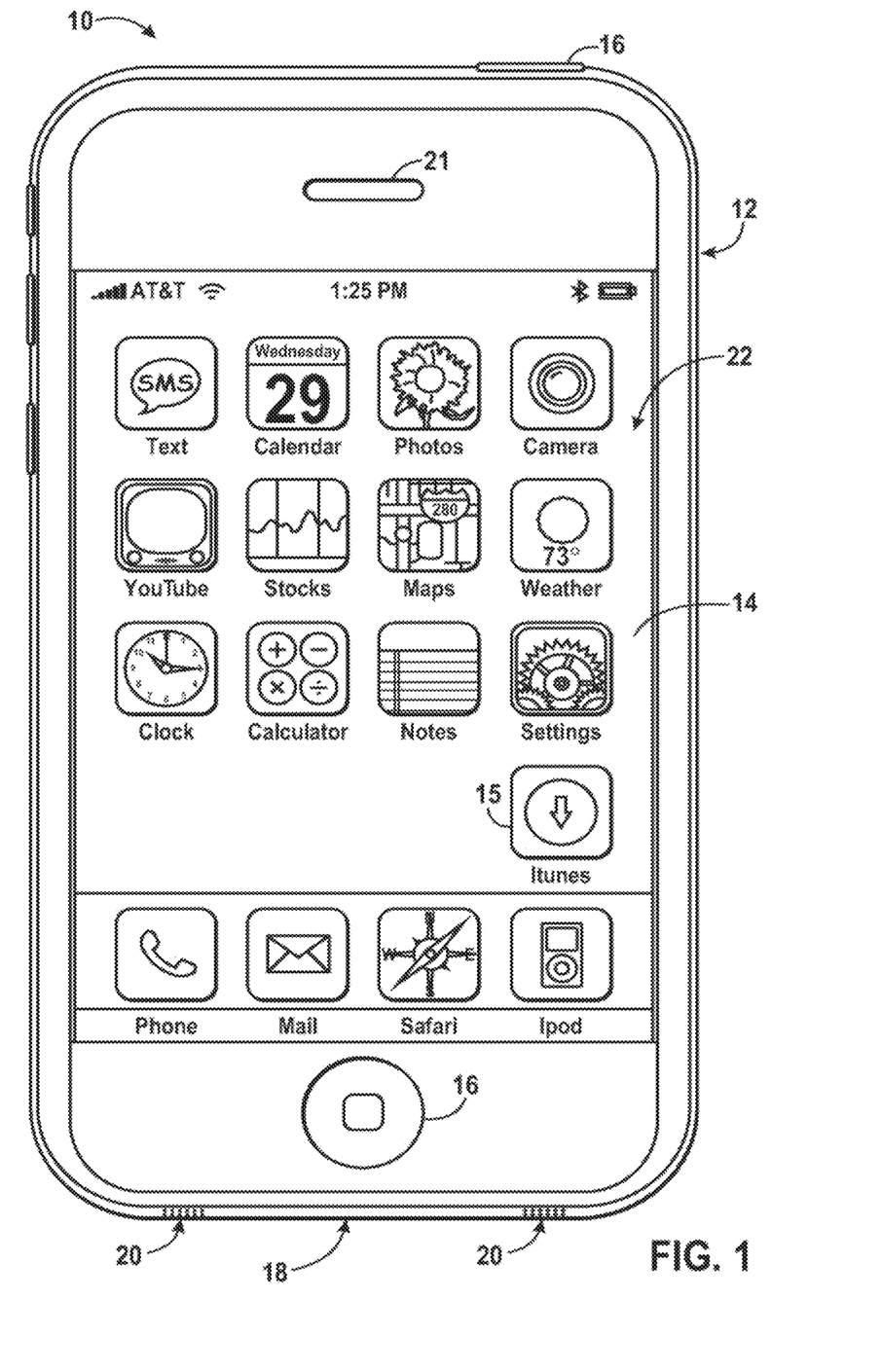
FIG. 1 is a perspective view illustrating an electronic device, such as a portable media player, in accordance with one embodiment of the present invention.

Turning now to the figures, FIG. 1 depicts an electronic device 10 in accordance with one embodiment of the present invention. In some embodiments, the electronic device 10 may be a media player for playing music and/or video, a cellular phone, a personal data organizer, or any combination thereof. Thus, the electronic device 10 may be a unified device providing any one of or a combination of the functionality of a media player, a cellular phone, a personal data organizer, and so forth. In addition, the electronic device 10 may allow a user to connect to and communicate through the internet or through other networks, such as local or wide area networks. For example, the electronic device 10 may allow a user to communicate using e-mail, text messaging, instant messaging, or using other forms of electronic communication. By way of example, the electronic device 10 may be a model of an IPod® having a display screen or an IPhone® available from Apple Inc.

In certain embodiments the electronic device 10 may be powered by a rechargeable or replaceable battery. Such battery-powered implementations may be highly portable, allowing a user to carry the electronic device 10 while traveling, working, exercising, and so forth. In this manner, a user of the electronic device 10, depending on the functionalities provided by the electronic device 10, may listen to music, play games or video, record video or take pictures, place and take telephone calls, communicate with others, control other devices (e.g., the device 10 may include remote control and/or Bluetooth functionality, for example), and so forth while moving freely with the device 10. In addition, in certain embodiments the device 10 may be sized such that it fits relatively easily into a pocket or hand of the user. In such embodiments, the device 10 is relatively small and easily handled and utilized by its user and thus may be taken practically anywhere the user travels. While the present discussion and examples described herein generally reference an electronic device 10 which is portable, such as that depicted in FIG. 1, it should be understood that the techniques discussed herein may be applicable to any electronic device having a display, regardless of the portability of the device.

In the depicted embodiment the electronic device 10 includes an enclosure 12, a display 14, user input structures 16, and input/output connectors 18. The enclosure 12 may be formed from plastic, metal, composite materials, or other suitable materials or any combination thereof. The enclosure 12 may protect the interior components of the electronic device 10 from physical damage, and may also shield the interior components from electromagnetic interference (EMI).

The display 14 may be a liquid crystal display (LCD) or may be a light emitting diode (LED) based display, an organic light emitting diode (OLED) based display, or other suitable display. In accordance with certain embodiments of the present technique, the display 14 may display a user interface 22 as well as various images 15, such as logos, avatars, photos, album art, and so forth. Additionally, in one embodiment the display 14 may be a touch screen through which a user may interact with the user interface. The display 14 may also display various function and/or system indicators to provide feedback to a user, such as power status, call status, memory status, etc. These indicators may be in incorporated into the user interface displayed on the display 14. As discussed herein, in certain embodiments the user interface 22 may be displayed on the display 14, and may provide a mechanism for a user to interact with the electronic device 10. The user interface may be a textual user interface, a graphical user interface (GUI), or any combination thereof, and may include various layers, windows, screens, templates, elements or other components that may be displayed in all of or areas of the display 14.

In one embodiment, one or more of the user input structures 16 are configured to control the device 10, such as by controlling a mode of operation, an output level an output type, etc. For instance, the user input structures 16 may include a button to turn the device 10 on or off. In general, embodiments of the electronic device 10 may include any number of user input structures 16, including buttons, switches, a control pad, keys, knobs, a scroll wheel, or any other suitable input structures. The input structures 16 may work with a user interface displayed on the device 10 to control functions of the device 10 or of other devices connected to or used by the device 10. For example, the user input structures 18 may allow a user to navigate a displayed user interface or to return such a displayed user interface to a default or home screen.

The user interface 22 may, in certain embodiments, allow a user to interface with displayed interface elements via the one or more user input structures 16 and/or via a touch sensitive implementation of the display 14. In such embodiments, the user interface provides interactive functionality, allowing a user to select, by touch screen or other input structure, from among options displayed on the display 14. Thus the user can operate the device 10 by appropriate interaction with the user interface 22. The user interface 22 may of any suitable design to allow interaction between a user and the device 10. Thus, the user interface 22 may provide windows, menus, graphics, text, keyboards or numeric keypads, scrolling devices, or any ether elements. In one embodiment, the user interface 22 may include screens, templates, and UI components, and may include or be divided into any number of these or other elements. The arrangement of the elements of user interface 22 may be hierarchical, such that a screen includes one or more templates, a template includes one or UI components. It should be appreciated that other embodiments may arrange user interface elements in any hierarchical or non-hierarchical structure.

The electronic device 10 may also include various input and output ports 18 to allow connection of additional devices. For example, a port 18 may be a headphone jack that provides for connection of headphones. Additionally, a port 18 may have both input/output capabilities to provide for connection of a headset (e.g. a headphone and microphone combination). Embodiments of the present invention may include any number of input and/or output ports, including headphone and headset jacks, universal serial bus (USB) ports, Firewire or IEEE-1394 ports, and AC and/or DC power connectors. Further, the device 10 may use the input and output ports to connect to and send or receive data with any other device, such as other portable electronic devices, personal computers, printers, etc. For example, in one embodiment the electronic device 10 may connect to a personal computer via a Firewire or IEEE-1394 connection to send and receive data files, such as media files.

The electronic device 10 may also include various audio input and output portions. For example, an input receiver 20 may be a microphone that receives user audio input. Additionally, the output transmitter 21 may be a speaker that transmits audio signals to a user. The input receiver 20 and the output transmitter 21 may be used in conjunction as audio elements of a telephone.

Figure 2:
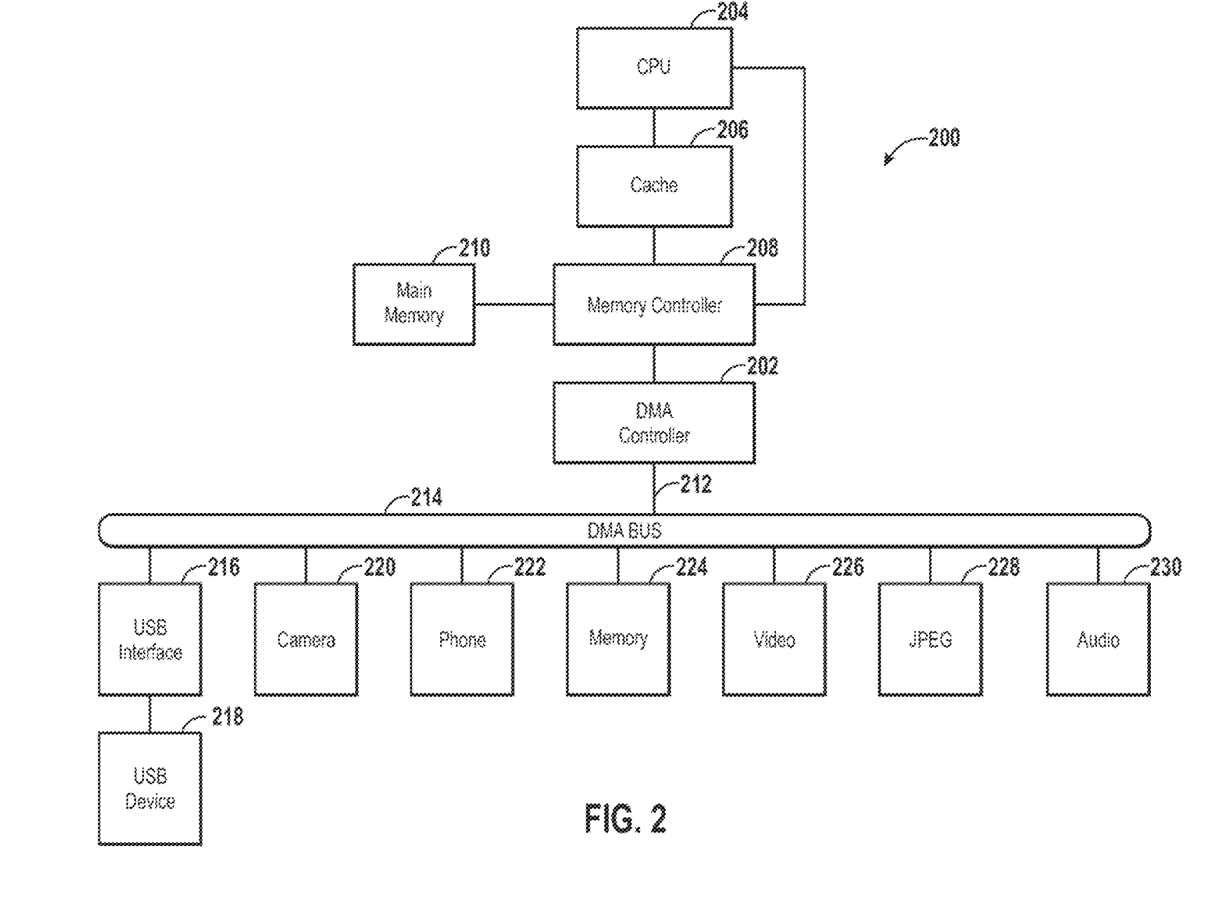
FIG. 2 is a simplified, block diagram of the portable media player of FIG. 1 in accordance with one embodiment of the present invention.

Turning now to FIG. 2, a block diagram 200 of components of an illustrative electronic device 10 is shown. The block diagram includes a DMA controller 202 connected to a central processing unit ("CPU") 204. The CPU 204 may include a single processor or it may include a plurality of processors. In another embodiment, the CPU 204 may include one or more "general-purpose" microprocessors, a combination of general and special purpose microprocessors, and/or ASICS. For example, the CPU 204 may include one or more reduced instruction set (RISC) processors, as well as graphics processors, video processors, and/or related chip sets. The CPU 204 may provide the processing capability required to execute the operating system, programs, user interface 22, and any other functions of the device 10. The CPU 204 may also include non-volatile memory, such as ROM, which may be used to store the firmware for the device 10, such as an operating system for the device 10 and/or any other programs or executable code necessary for the device 10 to function.

The CPU 204 may be connected to a cache memory 206, which may be used as a temporary storage location for data which is to be rapidly accessed by the CPU 204. The cache memory 206 may be connected to the memory controller 208, which regulates the flow of data, and instructions between the main memory 210 and the cache memory 206, or, if the need for the data and instructions is urgent or the data and instructions are prohibited from being temporarily stored in the cache memory 208, directly between the main memory 210 and the CPU 204. In one embodiment, the flow of data and instructions between the DMA controller 202 and the memory controller 208 is done without determining the contents of the cache memory 208. In another embodiment, the flow of data and instructions between the DMA controller 202 and the memory controller 208 is accomplished after determining the current contents of cache memory 206. In a further embodiment, the DMA controller 202 may be directly connected to the CPU 204. Moreover, the accessing of data for storage in the main memory 210 and the cache memory 208 may be performed over secondary busses separate from the operation of the DMA controller 202.

The DMA controller 202 may operate as a control device for the transfer of data between the I/O devices, e.g. the USB device 218 and the audio circuitry 230, between the main memory 210 and an I/O device, e.g. the audio circuitry 230, or between an I/O device, e.g. the audio circuitry 230, and the main memory 210. It is envisioned that the particular DMA controller 202 utilized may have other functions as described in the commonly assigned U.S. patent application Ser. No. 12/060,728, filed Apr. 1, 2008, entitled, "Central DMA with Arbitrary Processing Functions," the disclosure of which is hereby incorporated by reference in its entirety. The DMA controller 202 may be connected to a DMA bus 214 by way of a DMA interconnect 212. The DMA interconnect 212 acts to transmit data, command, and clack signals, as well as receive DMA request signals and transferred data from a target I/O device. These transmitted and received signals may be collectively referred to as "DMA transfer signals." The DMA interconnect 212 also receives command and data signals transmitted via the DMA bus 214 from the I/O devices. The DMA bus 214 acts as a conduit for the DMA transfer signals and for the command and data signals from the I/O devices. The DMA bus 214 may include a plurality of DMA channels. Each DMA channel may be a path connecting the DMA controller 202 to any specific I/O device. In one embodiment, these paths may be active simultaneously, in effect, sharing the DMA bus 214.

The DMA bus 214 may be connected to a plurality of devices such as a USB ("Universal Serial Bus") device 218 through a USB interface 216, the camera circuitry 220, the phone circuitry 222, the video circuitry 226, the JPEG (Joint Photographic Experts Group) circuitry 228, and the audio circuitry 230. Additional circuitry such as user interface circuitry and display circuitry corresponding to elements pictured in FIG. 1 may also be connected to the DMA bus 214. Furthermore, a long term memory 224 may be connected to the DMA bus 214. The long term memory 224 may be non-volatile memory such as flash memory, magnetic drives, optical drives, or read only memory circuitry. The long term memory 224 may store data files such as media (e.g., music and video files), software (e.g., for implementing functions on device 10), preference information (e.g., media playback preferences), wireless connection information (e.g., information that may enable media device to establish a wireless connection such as a telephone connection), subscription information (e.g., information that maintains a record of podcasts or television shows or other media a user subscribes to), telephone information (e.g., telephone numbers), and any other suitable data.

The USB interface 216 may be connected to a USB device 213. This USB device 218 may be, for example, an external flash memory circuit or an external hard disk drive. The camera circuitry 220 may allow a user to take digital photographs. The phone circuitry 222 may allow a user to receive or make a telephone call. In one embodiment, the phone circuitry 222 may interact with the input receiver 20 and the output transmitter 21 of FIG. 1 to complete a telephone call. The video circuitry 226 may be used to encode and decode video samples, either taken by the user in conjunction with the camera circuitry 220, or downloaded from an external source such as the internet. Similarly, the JPEG circuitry 228 may allow for encoding and decoding of pictures taken by the user in conjunction with the camera circuitry 220, or downloaded from an external source such as the internet. Finally, the audio circuitry 230 may allow for the playing of audio files such as compressed music files.

Figure 3:
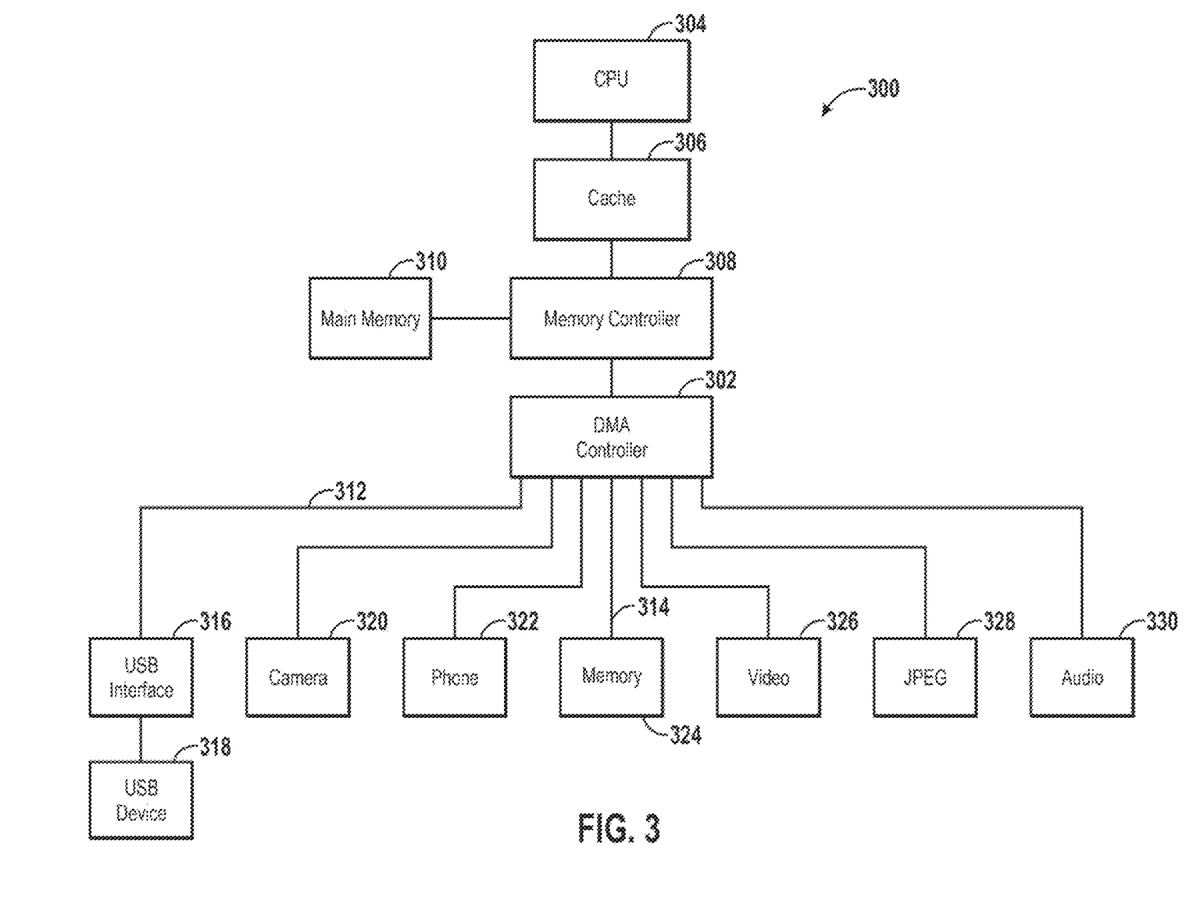
FIG. 3 is a simplified block diagram of the portable media player of FIG. 1 in accordance with a second embodiment of the present invention.

Turning now to FIG. 3, a block diagram of components of an illustrative electronic device 10 is shown. The block diagram includes a DMA controller 302 connected to a CPU 304. The CPU 304 may include a single processor or it may include a plurality of processors. In another embodiment, the CPU 304 may include one or more "general-purpose" microprocessors, a combination of one or more general and special purpose microprocessors, and/or ASICS. For example, the CPU 304 may include one or more reduced instruction set (RISC) processors, as well as graphics processors, video processors, and/or related chip sets. The CPU 304 may provide the processing capability required to execute the operating system, programs, the user interface 22, and any other functions of the device 10. The CPU 304 may also include non-volatile memory, such as ROM, which may be used to store the firmware for the device 10, such as an operating system for the device 10 and/or any other programs or executable code necessary for the device 10 to function.

The CPU may be connected to a cache memory 306, which may be used as a temporary storage location for data which is to be rapidly accessed by the CPU. The cache memory 306 may be connected to the memory controller 308, which regulates the flow of data and instructions between the main memory 310 and the cache memory 308. Moreover, if the need for the data and instructions is urgent or the data, and instructions are prohibited from being temporarily stored in the cache memory 306, the memory controller 308 may also regulate the flow of data and instructions directly between the main memory 310 and the CPU 304. In one embodiment, the flow of data and instructions between the DMA controller 302 and the memory controller 308 is done without determining the contents of the cache memory 306. In another embodiment, the flow of data and instructions between the DMA controller 302 and the memory controller 308 is accomplished after determining the current contents of cache memory 306. In a further embodiment, the DMA controller 302 may be directly connected to the CPU 304. Moreover, the accessing of data for storage in the main memory 310 and the cache memory 308 may be performed over secondary busses separate from the operation of the DMA controller 302.

The DMA controller 302 may operate as a control device for the transfer of data between the I/O devices, e.g. the USB device 318 and the audio circuitry 330, between the main memory 310 and an I/O device, e.g. the audio circuitry 330, or between an I/O device, e.g. the audio circuitry 330, and the main memory 310. Each DMA channel may be a path connecting the DMA controller 302 to any specific I/O device. The DMA controller 302 may be connected to a plurality of I/O devices along a plurality of independent DMA channels, e.g. the independent DMA channel line 312. The independent DMA channel line 312 is representative of a particular DMA path with an I/O device. The independent DMA channel line 312 may be used to transmit data, command, and clock signals from the DMA controller 302 to the USB device 318 by way of the USB interface 316. The USB device 318 may be, for example, an external flash memory circuit or an external hard disk drive. The independent DMA channel line 312 also may be used to transmit DMA request signals and data from the I/O device (for example, the USB device 318 via the USB interface 316) to the DMA controller 302.

The DMA controller 302 also may be connected to a plurality of devices such as the camera circuitry 320, the phone circuitry 322, the video circuitry 326, the JPEG circuitry 328, and the audio circuitry 330 along the independent DMA channel lines. Additional circuitry such as user interface circuitry and display circuitry corresponding to elements pictured in FIG. 1 may also be connected to the DMA controller 302. The camera circuitry 320 may allow a user to take digital photographs. The phone circuitry 322 may allow a user to receive or make a telephone call. In one embodiment, phone circuitry 22 may interact with the input receiver 20 and output transmitter 21 of FIG. 1 to complete a telephone call. The video circuitry 326 may be used to encode and decode video samples, either taken by the user in conjunction with the camera circuitry 320, or downloaded from an external source such as the internet. Similarly, the JPEG circuitry 228 may allow for encoding and decoding of pictures taken by the user in conjunction with the camera circuitry 320, or downloaded from an external source such as the internet. The audio circuitry 330 may allow for the playing of audio files such as compressed music files.

Similarly, an independent DMA channel line 314 is representative of a DMA channel connected to a long term memory 324. The independent DMA channel line 314 may be used to transmit data, command, and clock signals from the DMA controller 302 to the long term memory 324. The long term memory 324 may be non-volatile memory such as flash memory, magnetic drives, optical drives, or read only memory circuitry. The long term memory 324 may store data files such as media (e.g., music and video files), software (e.g., for implementing functions on device 10), preference information (e.g., media playback preferences), wireless connection information (e.g., information that may enable media device to establish a wireless connection such as a telephone connection), subscription information (e.g., information that maintains a record of podcasts or television shows or other media a user subscribes to), telephone information (e.g., telephone numbers), and any other suitable data. The independent DMA channel line 314 also may be used to transmit DMA request signals and data from the long term memory 384 to the DMA controller 302.

Figure 4:
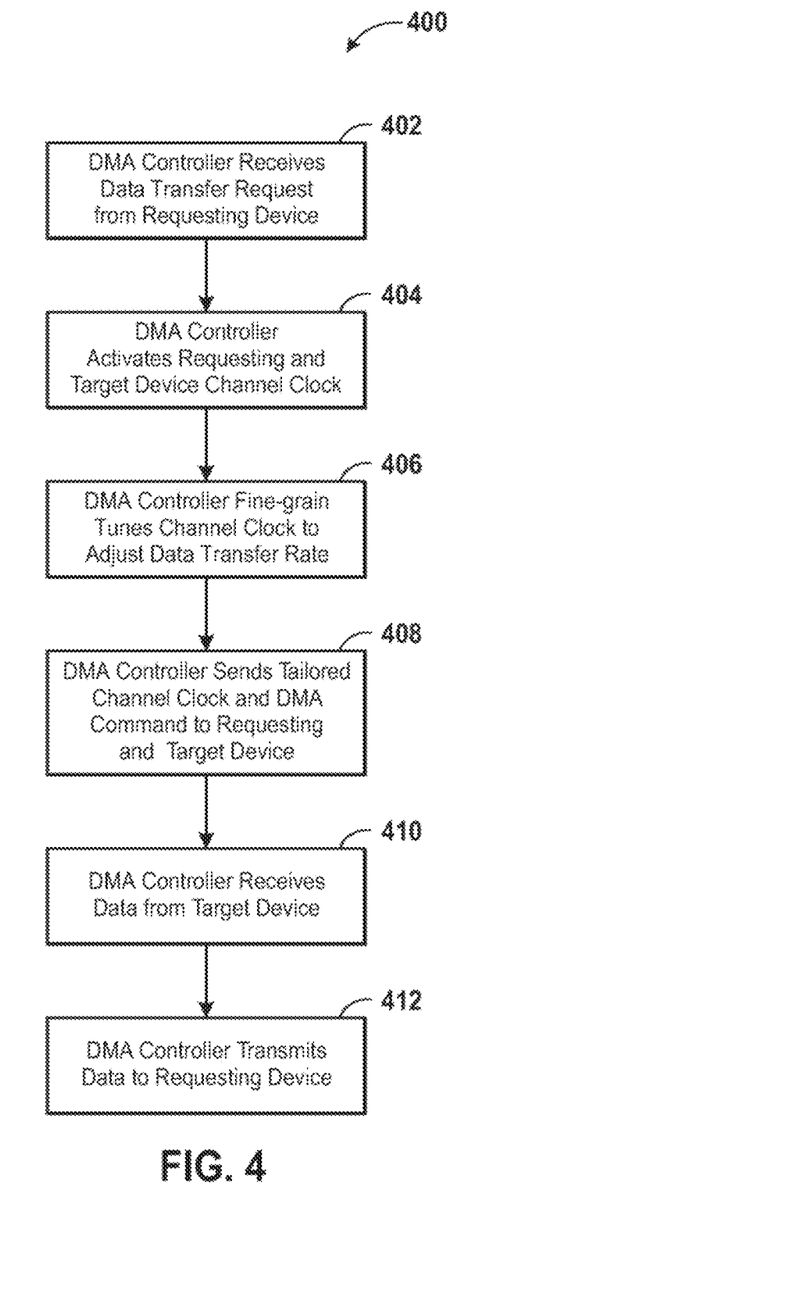
FIG. 4 is a flowchart depicting the operation of a portable media player in performing a DMA transfer in accordance with an embodiment of the present invention.

FIG. 4 depicts a flowchart representing a method 400 showing a DMA transfer in accordance with an embodiment of the present invention. The steps will first be discussed in conjunction with the system outlined in FIG. 3, in step 402, the DMA controller 302 receives a data transfer request from a requesting device, for example the USB device 318 through USB interface 316. The DMA controller 302 determines the location of the requested data. This location is the target device. For example, the data could be located in long term memory 324.

In step 404, the DMA controller 302 activates the DMA channel clocks along the independent DMA channel line 312 corresponding to the requesting device, for example, the USB device 318 through USB interface 316, and along the independent DMA channel line 314 corresponding to the target device, for example, the long term memory 324. The DMA controller 302 determines the minimum clock frequency that may be applied along the independent DMA channel line 314 to successfully transfer data and commands between the DMA controller 302 and the target device, as well as the minimum clock frequency that may be applied along the independent DMA channel line 312 to successfully transfer data and commands between the DMA controller 302 and the requesting device.

The amount of data transferred during a certain time period (i.e. using a certain clock frequency) may be referred to as the bandwidth utilized in the data transfer. Thus, the bandwidth used for any given DMA channel can be found by determining the transfer rate of the data. The transfer rate of data (in bytes) can be found by finding the number of bits that are transferred (across a channel of a predetermined width) times the clock rate (frequency) times the data rate per clock cycle (typically 1) divided by 8 (8 bits per byte). Therefore, the bandwidth utilized in a DMA transfer is directly proportional to the frequency of the DMA channel clock used during the transfer. However, the higher the frequency of the DMA channel clock, the more power is consumed during the DMA transfer, in portable electronic systems, conserving power is exceedingly important, and thus, by dropping the frequency of the clock to the slowest possible values at which the requesting and target I/O devices may operate, the system may conserve power during DMA transfers. In another embodiment, power is conserved by turning off all DMA channel clocks for devices not currently in use.

In step 406, the DMA controller 302 may tune the channel clocks along the independent DMA channel line 312 corresponding to the requesting device, for example, the USB device 318 through USB interface 316, and along the independent DMA channel line 314 corresponding to the target device, for example, the long term memory 324. In one embodiment, clock division circuitry may be used to tune the channel clock.

In step 408, the DMA controller 302 sends the tuned channel clocks and DMA command signals to the requesting device and the target device. The target device receives the DMA channel clock and the command signal's and transmits the requested data to the DMA controller 302. The DMA controller 302 receives this transmitted data in step 410. Subsequently, in step 412, the DMA controller 302 transmits the received data from the target device to the requesting device. In the current example, the DMA controller 302 receives the requested data from long term memory 324 and subsequently transmits the data to the USB device 318 through USB interface 316.

Method 400 operates in a substantially similar manner with respect to system 300 when DMA controller 302, upon after receiving a data transfer request from a requesting device, determines that the target is main memory. The DMA channel clock to be sent to the requesting device is activated and tuned in exactly the same way, however, it is not necessary to activate and tune a DMA channel clock for the target device. This is due to the target device being main memory 310, which does not require a DMA channel line to be accessed.

Method 400 may also operate in a substantially similar manner with respect to system 200. In step 402, the DMA controller 202 receives a data transfer request from a requesting device, for example the USB device 218 through the USB interface 216. The DMA controller determines the location of the requested data. This location is the target device. For example, the data could be located in long term memory 224.

In step 404, the DMA controller 202 activates the DMA channel clock along a DMA channel passing through the DMA bus 214 to both the requesting device, for example, the USB device 218 through the USB interface 216, and the target device, for example, the long term memory 224. The DMA controller 202 determines the minimum clock frequency that may be applied to the DMA channel to successfully transfer data and commands between the DMA controller 202, the requesting device, and the target device. In the present example, the DMA determines the minimum clock rate necessary to operate the USB device 218, through the USB interface 216, and the long term memory 224. In step 406, the DMA controller 202 may tune the channel clock to the desired frequency necessary for operation of the USB device 218 through the USB interface 216 and the long term memory 224. In one embodiment, clock division circuitry may be used to tune the channel clock.

In step 408, the DMA controller 202 sends the tuned channel clock and DMA command signals to the requesting device and the target device. The target device receives the DMA channel clock and the command signals and transmits the requested data to the DMA controller 202. The DMA controller 202 receives this transmitted data in step 410. Subsequently, in step 412, the DMA controller 202 transmits the received data from the target device to the requesting device. In the current example, the DMA controller 202 receives the requested data from the long term memory 224 and subsequently transmits the data to the USB device 218 through USB interlace 216.

Method 400 may operate in a substantially similar manner with respect to system 200 when DMA controller 202, after receiving a data transfer request from a requesting device, determines that the target is main memory. The DMA channel clock to be sent to the requesting device is activated and tuned in exactly the same way, however, it is not necessary to activate and tune a DMA channel clock for the target device. This is due to the target device being main memory 210, which does not require a DMA channel line to be accessed.

Figure 5:
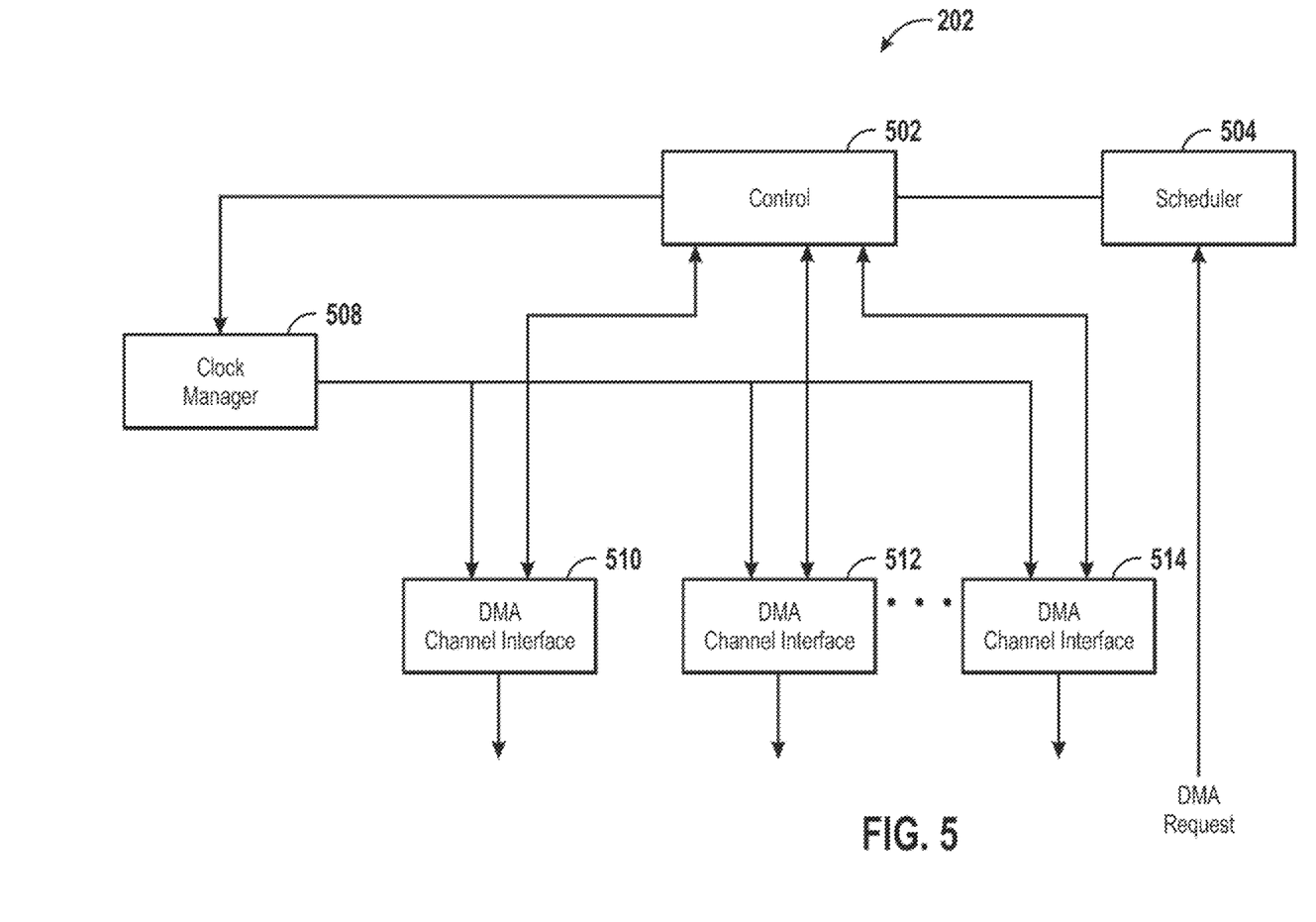
FIG. 5 is a simplified block diagram of the DMA controller of FIGS. 1 and 2 in accordance with one embodiment of the present invention.

FIG. 5 depicts a simplified block diagram of the DMA controller of FIGS. 2 and 3 in accordance with one embodiment of the present invention. A DMA controller 202 is illustrated in FIG. 5. FIG. 5 also may correspond to the DMA controller 302. The DMA controller 202 includes the control circuitry 502. The DMA controller 202 is capable of initializing DMA transfers, managing all DMA channels, and managing the DMA channel clocks, as well as DMA bus 214, utilizing the control circuitry 502. The DMA controller 202 is able to perform these functions through the control circuitry 502 because the DMA controller 202 is the master of the DMA bus 214. Similarly, DMA controller 302 is master of the independent DMA channel lines, e.g. 312 and 314. Therefore, the DMA controller 202 knows any and all devices utilizing the DMA bus 214 and can determine specific DMA transfer characteristics based on this knowledge. Similarly, the DMA controller 302, knows any and all devices utilizing the independent DMA channel lines, e.g. 312 and 314, and can determine specific DMA transfer characteristics based on this knowledge.

The scheduler 504 assists in determining when devices are utilizing the DMA bus 214 or the independent DMA channel lines, e.g. 312 and 314. The control circuitry 502 receives information pertaining to transfer device DMA requests from the scheduler 504. In one embodiment, the scheduler 504 can reside inside the control circuitry 502. In another embodiment, any DMA requests are sent along each independent DMA channel line, e.g. 312, and are passed to the scheduler 504 by way of the specified DMA channel interface, e.g. 510. The scheduler 504 operates to determine which DMA request for data transfers shall be given priority. In one embodiment, the requests are processed by way of a first-in-first-out methodology. In another embodiment, each channel is given a weight value. The higher the weight value assigned to a particular DMA channel, the higher scheduling priority that channel receives for a particular DMA transfer.

The control circuitry 502 controls all DMA channel clocks through a clock manager 508. The clock manager 508 may receive initialization signals from the control circuitry 502. These initialization signals may include information as to which DMA channels are to be activated. This information may be used by the clock manager 508 circuitry to activate and transmit channel clocks to the specified DMA channels. The initialization signals may also include information as to the frequency at which the DMA channel clocks should issue. In one embodiment, the clock manager 503 may include programmable clock circuitry from which a DMA channel clock at a specified frequency may issue. In a second embodiment, the clock manager 508 may include clock or frequency division circuitry. Clock or frequency division circuitry may be used to modify a global, or system clock, transmitted to the clock manager. The modification of the global or system clock by use of clock or frequency division circuitry results in a DMA channel clock at a specified frequency. In a further embodiment, phase locked loop circuitry may be used in the clock manager 508 to modify an input clock, creating a DMA channel clock at a specified frequency. In another embodiment, clock gating circuitry may be used for the reduction of DMA channel clock propagation.

The DMA channel clock may be sent as an input to a specified DMA channel interface, e.g. the DMA channel interface 510. The DMA interfaces 510-514 may receive signals from both the control circuitry 502 and the clock manager 508. The DMA interfaces 510-514 also may transmit data to the control circuitry 502. The DMA interfaces 510-514 may each transmit data along an independent DMA channel line, e.g. 312, to a target device. The DMA interfaces 510-514 may also transmit data along a DMA channel to a target device on a shared line, such as the DMA interconnect 212. In one embodiment, there exists a specific DMA channel interface corresponding to every DMA channel.

In another embodiment, the DMA channel clock is sent to all DMA channel interfaces 510-514. In this embodiment, signals from the control circuit 502 activate the appropriate DMA channel interface and allow the selected DMA channel interface, e.g. DMA channel interface 510, to transmit the DMA channel clock to a target device, in a second embodiment, individual clock lines issue from the clock manager 508 in a one-to-one correspondence with the plurality of DMA channel interfaces, 510-514. In this embodiment, each of the individual clock lines carries a DMA channel clock to a prescribed DMA channel interface, e.g. 510.

Figure 6:
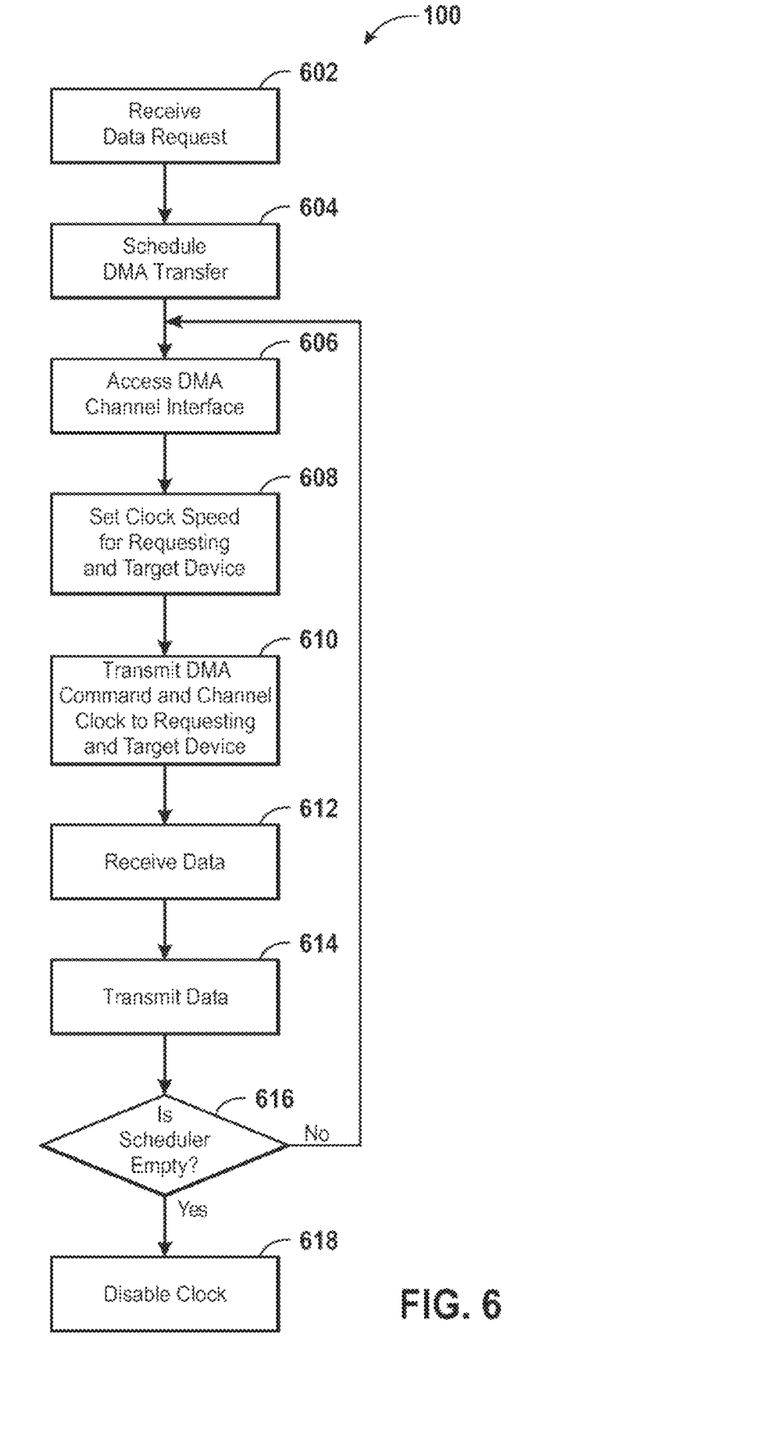
FIG. 6 is a flowchart depicting the operation of a DMA controller in accordance with an embodiment of the present invention.

FIG. 8 depicts a flowchart representing a method 600 showing a DMA transfer in accordance with an embodiment of the present invention. The steps will first be discussed in conjunction with the system outlined in FIG. 5. In step 602, the scheduler 504 receives a DMA transfer request from a requesting device, for example audio circuitry 330. The scheduler may also receive a secondary DMA request in step 602.

In step 604, the scheduler 504 may schedule a DMA transfer, in one embodiment, this may be done using a FIFO (first-in-first-out) methodology. That is, the DMA transfers may be scheduled according to the order in which they are received by the scheduler 504. In a second embodiment the scheduler 504 may schedule received DMA transfer requests based upon a ranking system. In this embodiment, each requesting device is assigned a priority ranking. A device with a high priority ranking will have its DMA transfer request scheduled before the DMA transfer request of a low priority device. All DMA transfer requests with a priority lower than the high priority DMA transfer request will be queued according to their respective priority ranking. In another embodiment, DMA transfer requests with a certain priority will cause the scheduler 504 to interrupt any DMA transfer currently being processed. In this manner, DMA transfers that must occur in real time may be completed on schedule.

Once the scheduler 504 determines which DMA transfer request is to be processed, the appropriate DMA transfer request information is sent to the control circuitry 502. In one embodiment, this information may include the target device information and the data to be retrieved. The control circuitry 502 may then utilize this information to access the appropriate DMA channel interface in step 606. In one embodiment of step 606, the control circuitry 502 determines the location of the data to be received and activates the DMA channel interface corresponding to the target device, e.g. 510. Subsequently, the control circuitry 502 receives clock frequency data from the DMA channel interface corresponding to the target device, e.g. 510. This data is used by the control circuitry 502 in determining the particular frequency at which a DMA channel clock will to be sent to the DMA channel corresponding to the target device. Clock manager 508 may receive initialization signals from the control circuitry 502 in step 606.

These initialization signals are used to set the clock speed in step 606. The initialization signals may include information as to which DMA channel is to be activated and at what frequency the corresponding DMA clock should be issued to that channel. This information may be used by the clock manager 508 circuitry to activate, set, and transmit a channel clock at a specified frequency to the specified DMA channel for both the target and requesting devices. As described above, the clock manager 508 may include programmable clock circuitry, clock or frequency division circuitry, or phase locked loop circuitry to creating a DMA channel clock at a specified frequency. In one embodiment, the DMA channel clock is sent along a shared line to all the DMA channel interfaces 510-514. In this embodiment, signals from the control circuit 502 activate the appropriate DMA channel interface and allow the selected DMA channel interface, e.g. DMA channel interlace 510, to transmit the DMA channel clock to a target device and a requesting device. In a second embodiment, individual clock lines issue from the clock manager in a one-to-one correspondence with the plurality of DMA channel interfaces, 510-514. In this embodiment, each of the individual clock lines carries a DMA channel clock to a prescribed DMA channel interface, e.g. 510.

In addition to receiving a channel clock, the selected DMA interface, e.g. 510, may receive DMA command signals from the control circuitry 502. In step 610, the selected DMA interface, e.g. 510, may transmit a DMA transfer command and a DMA channel clock at the specified frequency along a DMA channel to a target device and to a requesting device on independent DMA channel lines, such as 312 and 314. The selected DMA interface, e.g. 510, may also transmit a DMA transfer command and the specified frequency channel clock along a DMA channel to a target and requesting device on a shared line, such as DMA interconnect 212 to the shared DMA bus 214.

In step 612, the data retrieved from the target device is received by the selected channel interface, e.g. 510. Once received, the control circuitry 502 may issue a command to the channel interface corresponding to the requesting device to transmit the received data to the requesting device. This transmission of the received data takes place in step 614. In one embodiment, data received in step 612 is queued until ready for transmission to the requesting device. In this embodiment, as the queued data is transmitted in step 614, newly received data is sent to the data queue to await transmission. This process continues until the data transfer form the target device is complete.

Once the last of the requested data has been transmitted in step 616, the control circuitry 502 determines if the scheduler 504 is empty. That is, the control circuitry 502 determines if the scheduler 504 has any scheduled DMA transfers remaining in its queue. If scheduled DMA transfers exist in the queue of the scheduler 504, then the above described process is repeated, as shown in FIG. 6 by the arrow going from step 616 to the how diagram between steps 604 and 606. If the queue of the scheduler 504 is empty, the control circuitry 502 sends a disable command to the clock manager 508. Upon receiving the disable command, clock manager 508 disables the DMA channel clock for the DMA channel interface corresponding to the target and requesting device in step 618. The disabling of the DMA channel clock in step 618 deactivates the DMA channels, because no signals may flow through a channel without a corresponding DMA channel clock.

Figure 7:
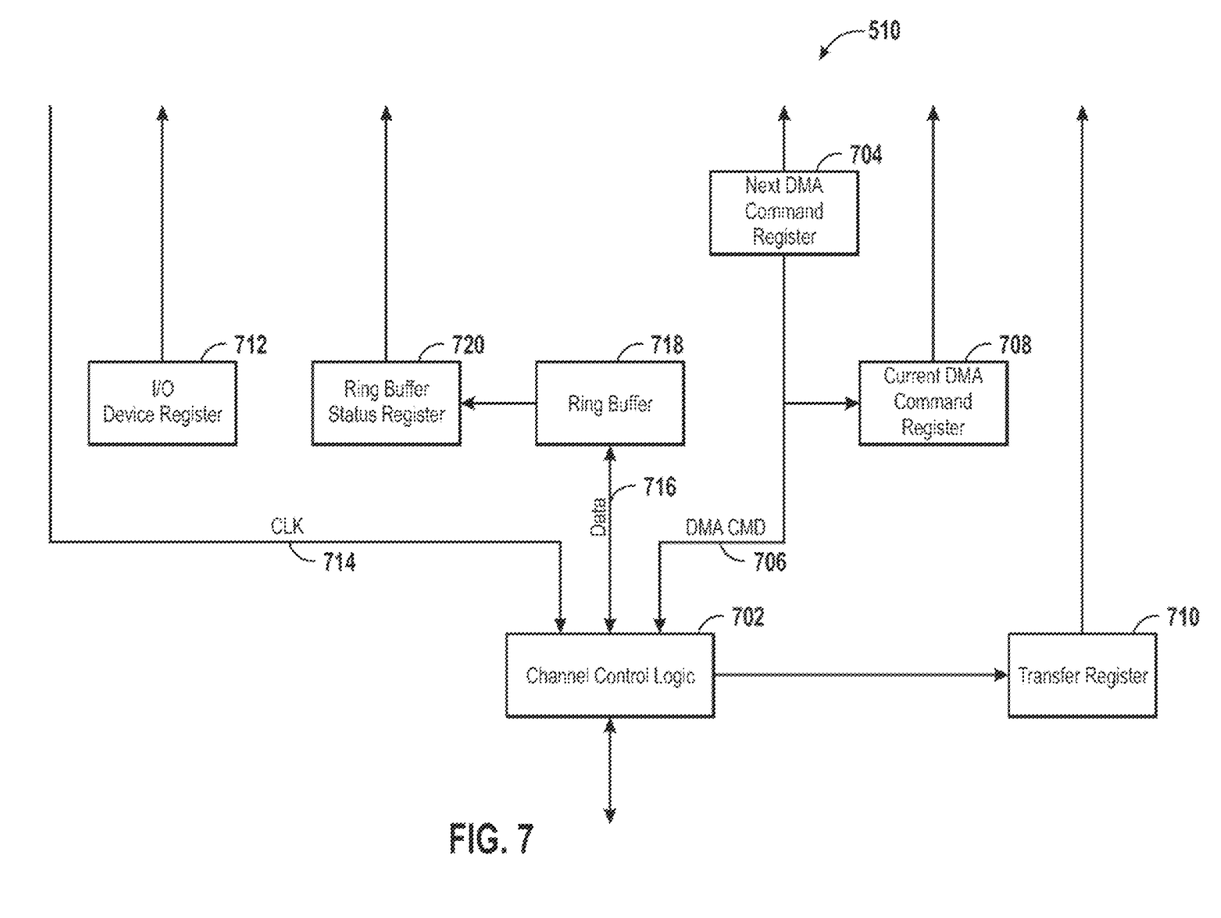
FIG. 7 is a simplified block diagram of a DMA channel interface of FIG. 5 in accordance with one embodiment of the present invention.

FIG. 7 is a simplified block diagram of a DMA channel interlace 510 of FIG. 5 in accordance with one embodiment of the present invention, in one embodiment the channel control logic 702 is used to configure and control the DMA channel. For example, the channel control logic 702 may disable the associated DMA channel at any given time, thus aborting any DMA transfer currently underway. In another embodiment, the channel control logic 702 is used in reporting the status of the DMA channel. For example, if an error occurs while the DMA channel is in use, or if a stoppage occurs during the use of the DMA channel, the channel control logic 702 may log and report the failure. The channel control logic 702 may receive a channel clock along the clock line 714. The channel control logic 702 may both transmit and receive data across the data line 716. Furthermore, the channel control logic 70S may also receive DMA command signals along a command line 706.

The DMA command signals are issued to the channel control logic 702 across the command line 706 from the next DMA command register 704. The next DMA command register 704 may act as a queue for DMA commands that are to be sent to the channel control logic 702. These DMA commands may include the address of data that the DMA controller 202 will read from a target device. The DMA commands may also include the address of data that the DMA controller 202 will write to in a requesting device. The DMA commands may also include halt commands or startup commands for the channel control logic 702.

When a DMA command has been executed, the next command in the queue located in the next DMA command register issues along the command line 708 to the channel control logic 702. The command line 706 is monitored by the current DMA command register 708. The current DMA command register 708 may store a copy of the current DMA command being executed. This information may be used, for example, if the DMA transfer is stopped for any reason. The control circuitry 502 may access the current DMA command register to determine the transfer that was in process when the stoppage occurred. Similarly, the transfer register 710 may access the data being transferred during a DMA transfer. For example, the transfer register 710 may determine how many bytes were actually transferred by the DMA controller 202 before a stoppage occurred. This allows control circuitry 502 to determine how much data was successfully moved from the target device to the requesting device.

The DMA channel interface 510 also includes an I/O device register 712. The I/O device register 712 may contain some I/O device control information. For example, the I/O device register may contain information as to the width of data that the I/O device may transfer at or accept. This information may be useful in determining the number of bytes to be transferred across the DMA channel. The I/O device register 712 may also include information as to the minimum channel clock frequency required for a DMA transfer along the DMA channel with a specified I/O device. This information may be used by the control circuitry 502 for setting the DMA clock frequency in the clock manager 512.

The data, line 716 may be connected to the ring buffer 718 through which data flows. The ring buffer 718 may be large enough so that a full cache line can fit into it. In one embodiment, the ring buffer may be either 32 or 84 bytes in size. In another embodiment, the ring buffer 718 is as large as the largest supported I/O device chunk size. In this manner, data is passed to the ring buffer 718 from the target device, by way of the channel control logic 702, and is transmitted to the requesting device from the ring buffer 718. A ring buffer status register 720 may be employed to determine how much data is in the ring buffer 718. This makes it possible, for example, to determine how much data has been transferred out of the ring buffer 718 in situations where the DMA transfer is stopped.

Figure 8:
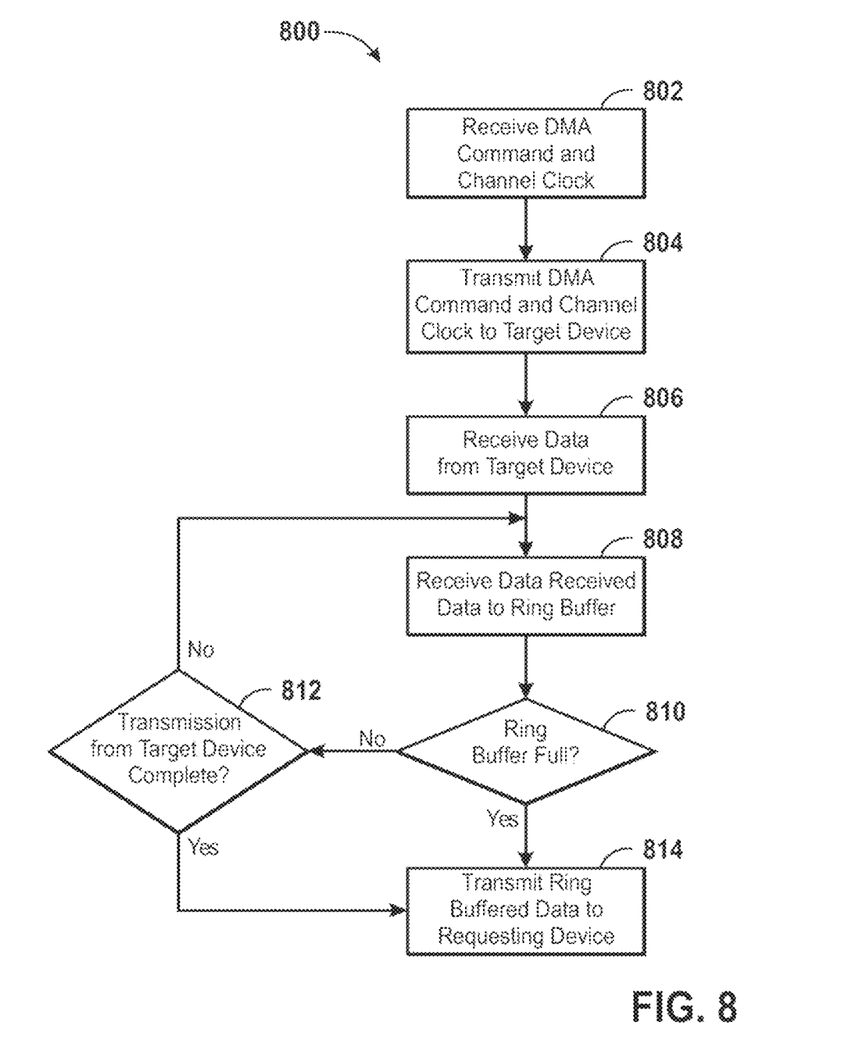

FIG. 8 is a flowchart 800 depicting the operation of the channel control logic 702 during a DMA transfer. In step 802, the channel control logic 702 receives a DMA command and a channel clock. In one embodiment, the DMA command issues from the queue in the next DMA command register 704. In another embodiment, the channel clock is tuned to the particular DMA channel specifications based on information sent to the control circuitry 502 from the I/O device register 712. In step 804, the channel control logic 702 transmits the DMA command and the channel clock to the target device. The DMA command and the channel clock may be transmitted either on a shared DMA bus, such as DMA bus 214, or along an individual DMA channel such as DMA channel 312.

The target device receives the DMA command and the channel clock and transmits the requested data. The channel control logic 702 receives the data from the target device in step 806. The data is transmitted from the channel control logic 702 to the ring buffer 718 in step 808. In one embodiment, this transfer queues the data so that it can be transferred to the requesting device at a size appropriate for the requesting device. For example, if the transfer device sends data in 16 byte blocks and the requesting device reads data in 32 byte blocks, then the ring buffer 718 may be used to form a single 32 byte block of data out of two 16 byte blocks of data transmitted to the channel control logic 702.

In step 810, the channel control logic determines if the ring buffer 718 is full. In one embodiment, the ring buffer 718 is full when no other data may be placed into the ring buffer 718. In a second embodiment, the ring buffer 718 is full when data is formed into a size appropriate for the requesting device to receive. If the ring buffer 718 is full, the channel control logic 702 transmits the ring buffered data to the requesting device in step 814. If, however, the ring buffer is not full, the channel control logic 702 determines if the transmission from the target device is complete in step 312. If the transmission from the target device is complete, then the channel control logic 702 transmits the ring buffered data to the requesting device in step 814. If, however, the transmission from the target device is not complete, the channel control logic 702 transmits received data from the target device to the ring buffer 718 in step 308, and the control register 702 repeats the steps described in flowchart 800. In another embodiment, if there is more data to be transmitted to the requesting device after step 814, the channel control logic 702 repeats the steps outlined in flow chart 800, starting from step 806.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method for implementing a direct memory access (DMA) access, comprising:
   receiving a data request from a requesting device at a scheduler;
   scheduling a DMA transfer within a scheduler queue, based at least in part on the data request;
   accessing a DMA channel interface corresponding to a target device;
   setting a clock speed for the requesting device and the target device;
   transmitting a DMA transfer command and a DMA channel clock to the requesting device and the target device;
   wherein the DMA transfer command is configured to initiate a data transfer; and
   when the scheduler queue is empty, disabling the DMA channel clock.

2. The method of claim 1, wherein the scheduling is performed according to a first-in-first-out (FIFO) scheme.

3. The method of claim 1, wherein the scheduling is performed according to a ranking scheme.

4. The method of claim 3, wherein the ranking scheme comprises assigning the requesting device a priority ranking, relative to one or more other requesting devices.

5. The method of claim 3, wherein at least one priority ranking of the ranking scheme is configured to interrupt any other concurrent data transfer.

6. A direct memory access (DMA) controller configured to control one or more DMA accesses, comprising:
   a scheduler configured to receive one or more data requests from one or more requesting devices;
   wherein the scheduler is further configured to schedule the received one or more data requests within a scheduler queue;
   control circuitry configured to access one or more DMA channel interfaces and set a clock speed for each one of the one or more DMA channel interfaces;
   wherein the controller circuitry is further configured to transmit one or more DMA transfer commands and cause the transmission of one or more DMA channel clocks via the one or more DMA channel interfaces;
   wherein each one of the one or more DMA transfer commands are configured to initiate data transfers; and
   wherein the control circuitry is configured to disable the DMA channel clock when the scheduler queue is empty.

7. The DMA controller of claim 6, further comprising a clock manager that includes a clock generation mechanism configured to create the one or more DMA channel clocks.

8. The DMA controller of claim 7, wherein the clock generation mechanism comprises one or more of: a programmable clock circuitry, a clock or frequency division circuitry, and a phase locked loop circuitry.

9. The DMA controller of claim 7, wherein the control circuitry is configured to enable and disable the clock manager.

10. The DMA controller of claim 7, where the clock manager is directly coupled to the one or more DMA channel interfaces.

11. The DMA controller of claim 6, where the one or more DMA channel interfaces comprises at least a first portion of independent DMA channel lines, and a second portion of shared DMA channel lines.

12. A method for controlling a direct memory access (DMA) channel during a DMA transfer, comprising:
   receiving a DMA transfer command and a DMA channel clock;

transmitting the DMA transfer command and the DMA channel clock to a target device;
receiving one or more data transfers from the target device and buffering at least a first portion of the one or more data transfers within a ring buffer; and
when the ring buffer is full or the target device has completed the one or more data transfers, transmitting the at least the first portion of the one or more data transfers.

13. The method of claim 12, further comprising sizing the one or more data transfers for a requesting device.

14. The method of claim 12, wherein the act of transmitting the DMA transfer command and the DMA channel clock to the target device is performed via an individual DMA channel.

15. The method of claim 12, wherein the act of transmitting the DMA transfer command and the DMA channel clock to the target device is performed via a shared DMA channel.

16. The method of claim 12, wherein the ring buffer is full when no other data may be buffered within the ring buffer.

17. The method of claim 16, further comprising determining whether there is more data to be transmitted to the requesting device after the act of transmitting the at least the first portion of the one or more data transfers.

18. The method of claim 17, further comprising buffering at least a second portion of the one or more data transfers within a ring buffer, and when the ring buffer is full or the target device has completed the one or more data transfers, transmitting the at least the second portion of the one or more data transfers.

19. The method of claim 12, further comprising tuning the DMA channel clock based on one or more parameters associated with a requesting device.

* * * * *